W. STRIEBY.
Cultivator.

No. {679, 31,683.}  Patented Mar. 12, 1861.

Witnesses:
Henry Howson
Horace See

Inventor:
Wm Strieby

UNITED STATES PATENT OFFICE.

WILLIAM STRIEBY, OF WAGONTOWN, PENNSYLVANIA.

IMPROVEMENT IN CULTIVATORS.

Specification forming part of Letters Patent No. 31,683, dated March 12, 1861.

*To all whom it may concern:*

Be it known that I, WILLIAM STRIEBY, of Wagontown, Chester county, Pennsylvania, have invented a new and useful Improvement in Cultivators; and I do hereby declare the following to be a full, clear, and exact description of the same, reference being had to the accompanying drawings, and to the letters of reference marked thereon.

My invention consists of a main beam having two teeth and two hinged vanes or shares, rendered adjustable by means of hooked rods and a perforated plate, in combination with certain side beams having teeth, and being so connected to the main beam as to be adjustable laterally as well as vertically, the whole of the parts being arranged in the manner described hereinafter, in order that the relative position of the teeth and vanes may be altered at pleasure every time the machine is drawn over the same track, thus effectually turning up, breaking, and spreading the soil.

In order to enable others skilled in the art to make and use my invention, I will now proceed to describe its construction and operation.

Figure 1:
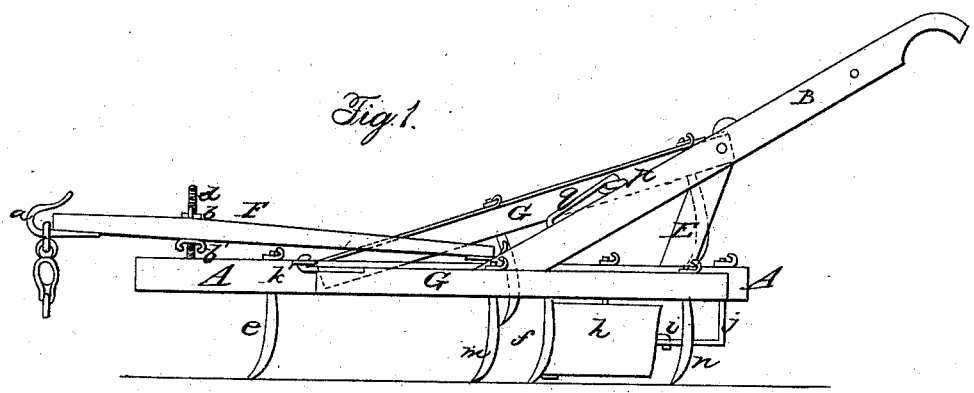
Figure 2:
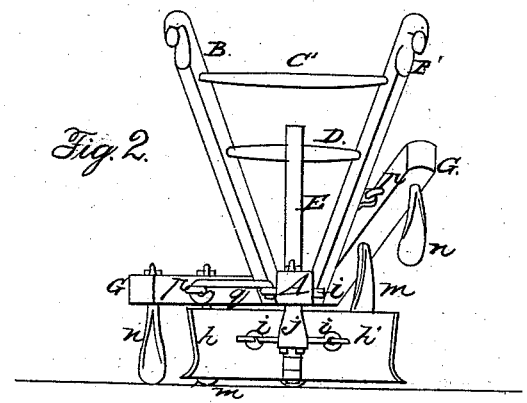
Figure 3:
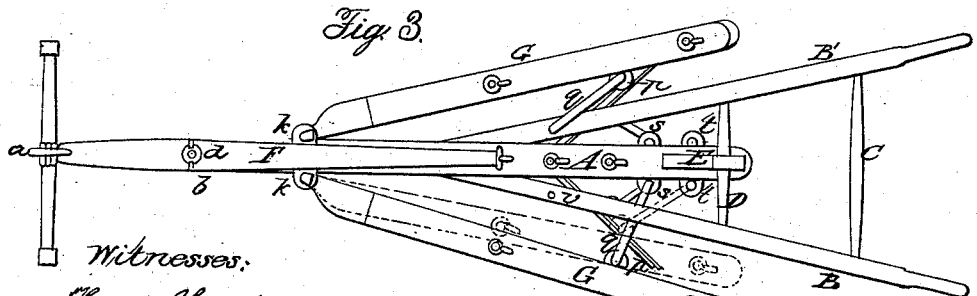

On reference to the accompanying drawings, which form a part of this specification, Figure 1 is a side view of my improved cultivator with one of the side frames elevated; Fig. 2, an end view of Fig. 1, and Fig. 3 a ground plan.

Similar letters refer to similar parts throughout the several views.

A is the main beam of the cultivator, to the opposite sides of which are secured the two handles B and B', connected together by the cross-bars C and D, and the latter being connected to the main beam A by the post E.

F is the pole, having at the end a hook, $a$, by means of which the machine is drawn over the ground, the pole being so connected to the main beam A, near the middle of the latter, that it can be readily raised and lowered at its outer end by means of the nuts $b$ and $b'$ of the screw $d$, which is secured to the pole, one of the nuts bearing on the upper and the other on the under side of the same. The main beam A has two teeth, one of them, $e$, in front, and the other one, $f$, in the rear. Behind the latter, and from the under side of the beam, projects a pin, to which are hinged the two vanes or shares, $h$ and $h'$, to each of which is jointed a rod, $i$, the ends of the rods being hooked, and their hooked ends fitting into openings in a plate, $j$, secured to the under side of the main beam A, and the plate having two rows of holes for receiving the hooked ends of the two rods, so that by adjusting the said rods into different holes one or both of the vanes or shares may be moved inward or outward at pleasure. On each side of the main beam is a staple, $k$, and to each staple a beam, G, is so jointed that it can be elevated or lowered and moved laterally in and out at pleasure. Each side beam, G, is furnished with two teeth, $m$ and $n$, and on the inside of each beam is a staple, $p$, to which is jointed a rod, $q$, the hooked end of the rod being arranged to fit into one or other of the two staples or eyes $s$ or $t$, secured, one pair on one side and a similar pair on the opposite side of the main beam A, or the hooked end of each rod may be fitted into an orifice, $v$, with which each of the handles is furnished near its junction with the main beam.

In using implements of this class, it is usual to draw them over the same track two, three, or more times. On traversing the track for the first time the shares or vanes $h$ and $h'$ may be adjusted so as to be as close together at their outward ends as the holes in the plate $j$, for receiving the hooked ends of the rods $i$, will allow, the side beams, G, being adjusted so as to spread outward to their farthest extent by connecting their rods to the staples $s$ of the beam A. Prior to traversing the track for the second time the vanes or shares $h$ and $h'$ may be spread outward, and the side beams, G G, moved inward to their utmost extent, and thus the position of the teeth of the side beams may be altered in respect to those of the main beam, and the position of the vanes or shares $h$ and $h'$ altered in respect to that of the teeth of the main beam and those of the two side beams every time the machine is drawn over the same track, thereby insuring a thorough uprooting and spreading of the soil.

In some instances it may be necessary to have the teeth of one of the side beams only in operation, in which case the other may be readily elevated by unhooking its rod $q$ from one or other of the staples $s$ or $t$, and fitting its hooked end into the orifice $v$ of one of the handles. In other instances it may not be necessary to use the teeth of either of the side beams, in which case both may be thus elevated.

It will be seen without further description that by drawing the machine over the same track two or three times, the above-mentioned parts being altered each time, the soil may be effectually turned up, broken, and spread toward the planted rows.

It should be understood that I do not claim, broadly, the use of adjustable teeth and shares in cultivators; nor do I claim any of the above-described parts viewed separately and independently of the specific arrangement of the whole; but

I claim as my invention and desire to secure by Letters Patent—

The beam A, its teeth $e$ and $f$, and its hinged vanes or shares $h$ and $h'$, the latter being rendered adjustable by the hooked rods $i$ and perforated plate $j$, in combination with the beams G G and their teeth $m$ and $n$, when the said beams are so connected to the beam A as to be adjusted laterally as well as vertically by means of the devices herein described, or their equivalents, and when the whole of the above-mentioned parts are arranged as and for the purpose herein set forth.

In testimony whereof I have signed my name to this specification in the presence of two subscribing witnesses.

WM. STRIEBY.

Witnesses:
HENRY HOWSON,
CHARLES D. FREEMAN.